(12) United States Patent  
Clark

(10) Patent No.: US 6,685,426 B2
(45) Date of Patent: Feb. 3, 2004

(54) TIP TREATMENT BAR WITH A DAMPING MATERIAL

(75) Inventor: Brynley Clark, Bristol (GB)

(73) Assignee: Rolls-Royce, PLC, London (GB)

( * ) Notice: Subject to any disclaimer, the term of this patent is extended or adjusted under 35 U.S.C. 154(b) by 20 days.

(21) Appl. No.: 10/085,104

(22) Filed: Mar. 1, 2002

(65) Prior Publication Data

US 2002/0122719 A1 Sep. 5, 2002

(30) Foreign Application Priority Data

Mar. 5, 2001 (GB) .............................................. 0105389

(51) Int. Cl.7 ................................................. F01D 25/04
(52) U.S. Cl. ......................................... 415/119; 415/9
(58) Field of Search ............................... 415/58.5, 58.7, 415/9, 119

(56) References Cited

U.S. PATENT DOCUMENTS 6,409,470 B2 * 6/2002 Allford et al. ............... 415/119
6,497,551 B1 * 12/2002 Hand et al. ...................... 415/9

FOREIGN PATENT DOCUMENTS

GB 2 356 588 A 5/2001
WO WO 94/20759 9/1994

* cited by examiner

Primary Examiner—Edward K. Look
Assistant Examiner—Kimya N McCoy
(74) Attorney, Agent, or Firm—Oliff & Berridge, PLC

(57) ABSTRACT

A tip treatment bar (16) for use in a gas turbine engine casing is provided with a cavity which is open on one side of the bar (16), the cavity being filled with a damping material (24). The bars (16) may be open ended. The damping material (24) reduces vibration amplitudes in the bar (16) caused by aerodynamic excitation, thus reducing high cycle fatigue of the tip treatment bars (16).

13 Claims, 4 Drawing Sheets

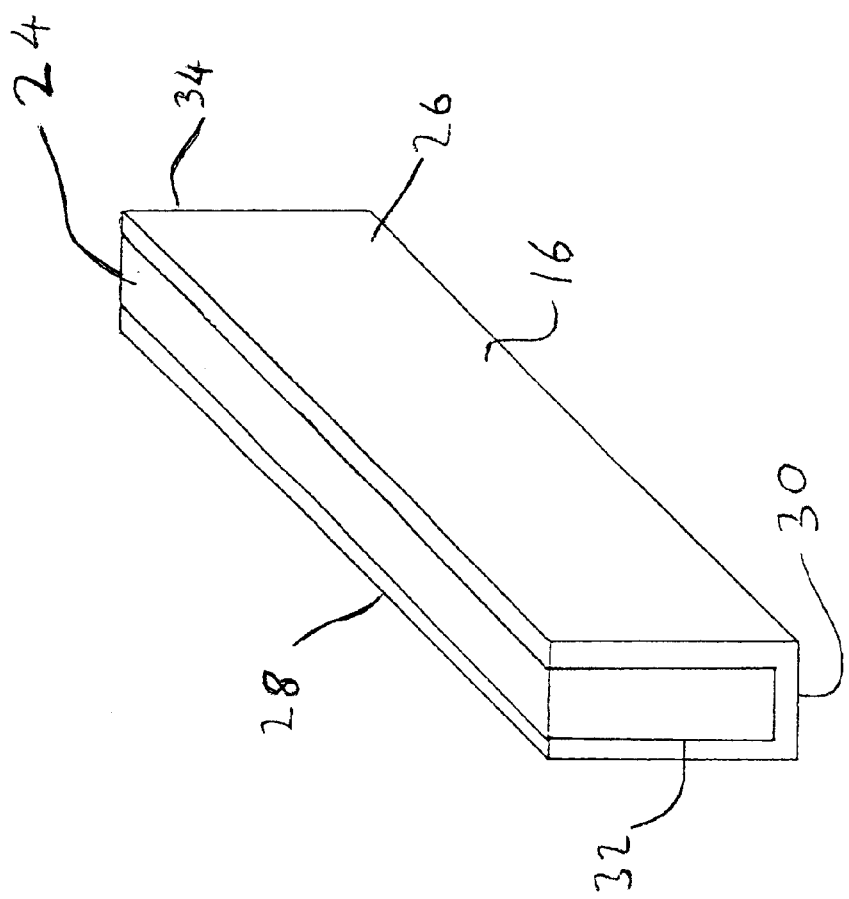

TIP TREATMENT BAR WITH A DAMPING MATERIAL

FIELD OF THE INVENTION

This invention relates to tip treatment bars of a rotor casing for a gas turbine engine.

BACKGROUND OF THE INVENTION AND PRIOR ART

WO94/20759 discloses an anti-stall tip treatment means in a gas turbine engine, in which an annular cavity is provided adjacent the blade tips of a compressor rotor. The cavity communicates with the gas flow path through the compressor through a series of slots defined between solid tip treatment bars extending across the mouth of the cavity.

Such tip treatments are applicable to both fans and compressors of gas turbine engines, and their purpose is to improve the blade stall characteristics or surge characteristics of the compressor.

In a gas turbine engine, blades of a rotating stage may become damaged or become detached from the rotating hub on which they are mounted. Damage of this type may be caused, for example, by impact or foreign object damage such as a bird strike. The blade, or fragment of a blade, which is shed, can cause catastrophic damage to other parts-of the engine, or even break through the engine casing and puncture the aircraft skin. The consequential effects of blade shedding can be particularly serious if the blade in question is in the compressor stage of the engine, and particularly near the front of the compressor stage, since such blades are the largest and heaviest in the engine.

Known tip treatment bars are solid and relatively robust and, in general, are as able as the adjacent parts of the casing to withstand impact from detached blades or blade fragments.

Another problem encountered with known tip treatments is high cycle fatigue failure. As the ends of the blades pass the tip treatment bars, the bars are aerodynamically excited. The resulting vibrations cause fatigue cracking in the bars, particularly at their ends.

It is an object of the present invention to reduce the strength of tip treatment bars.

A further object of the present invention is to increase the resistance of tip treatment bars to high cycle fatigue stress.

A more specific object of the present invention is to provide tip treatment bars which are sufficiently fragile so as to fracture under the impact of fragments of turbine blades, yet are resistant to fatigue damage.

SUMMARY OF THE INVENTION

According to the present invention there is provided a tip treatment bar for use in a gas turbine engine casing. The bar has a cavity which is open on one side of the bar. The cavity is filled with a damping material.

The cavity may extend lengthwise of the bar and may be divided by one or more partitions into separate cells spaced lengthwise of the bar.

The channel may be either open or closed at the ends of the bar.

The bar may be of rectangular cross-section, with the cavity opening at a shorter side of the cross-section.

The damping material reduces vibration amplitudes in the bar caused by aerodynamic excitation, thus reducing high cycle fatigue failure of the tip treatment bars.

The cavities in the tip treatment bars weaken them so that their resistance to impact from detached blades or blade fragments is substantially less than similar solid bars. Preferably, the damping material does not contribute significantly to the impact strength of the tip treatment bar under blade or blade tip release conditions. Consequently, such blades or blade fragments may break through the tip treatment bars, with minimal loss of kinetic energy, to be brought to rest by an external containment system such as a Kevlar wrap.

The bars may be formed from metal or from a composite material. Preferably, the damping material is a visco elastic material with a high temperature capability. A suitable material is a silicone moldmaking rubber, for example the material available from the Dow Corning Corporation under the name SILASTIC J®.

The tip treatment bars may be mounted between end supports connected to, or forming part of, the casing of the engine. The tip treatment bars may be integral with the end supports. Alternatively, the bars may be formed separately and subsequently assembled with the end supports.

BRIEF DESCRIPTION OF THE DRAWINGS

FIG. 3 is a perspective view of a first embodiment of a tip treatment bar;

DETAILED DESCRIPTION OF PREFERRED EMBODIMENTS

Figure 1:
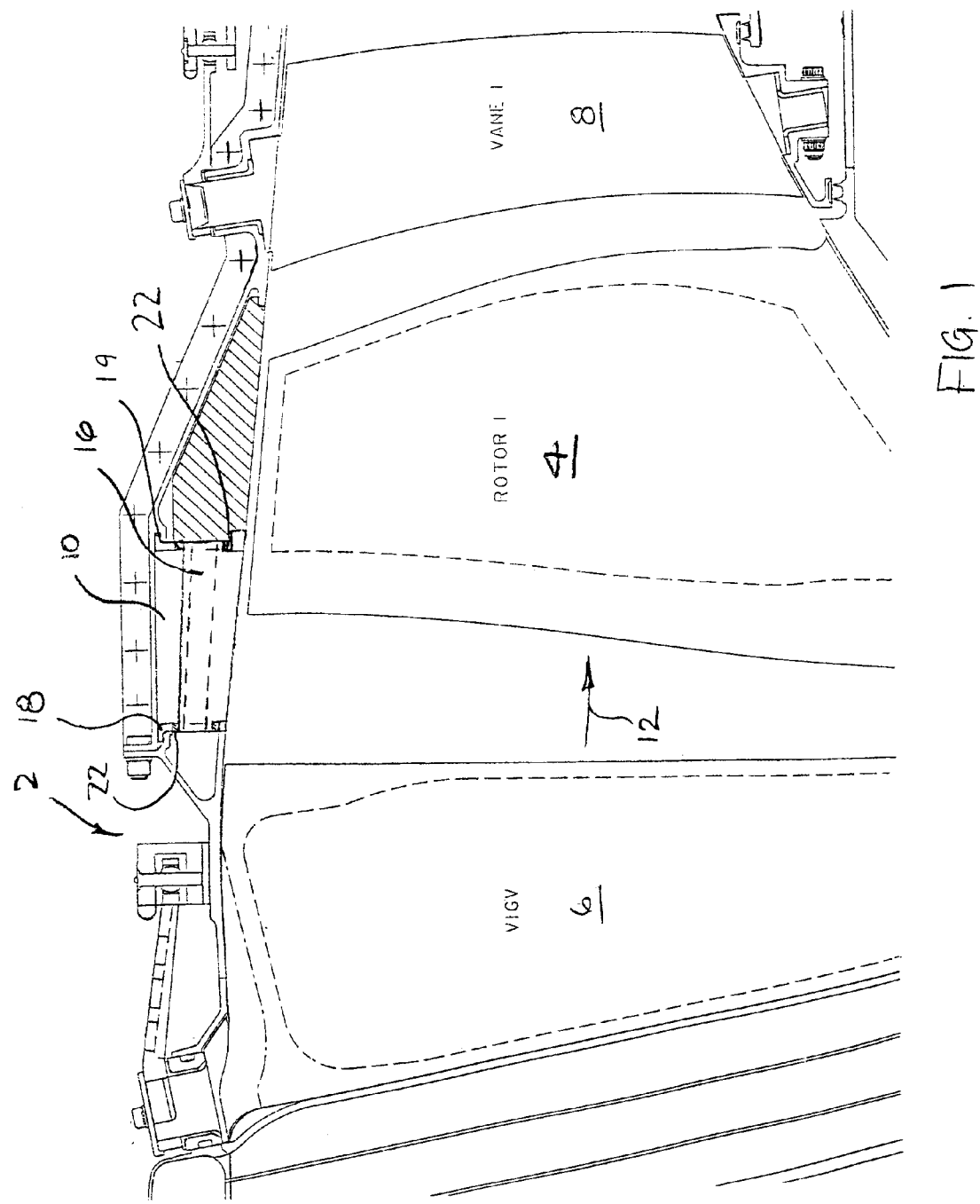
FIG. 1 is a partial axial sectional view of a fan stage in a gas turbine engine.

FIG. 1 shows a fan casing 2 of a gas turbine engine. A fan, represented by a single blade 4, is mounted for rotation in the casing 2. Guide vanes 6 and 8 are provided upstream and downstream, respectively, of the fan 4. The casing 2 includes a circumferentially extending chamber 10, which communicates with the main gas flow through the fan (represented by an arrow 12) through an array of slots 14 (see FIG. 2) defined between tip treatment bars 16 disposed around the casing. The function of the chamber 10 in delaying the onset of stalling of the blades 4 is disclosed in International Patent Publication WO94/20759.

Figure 2:
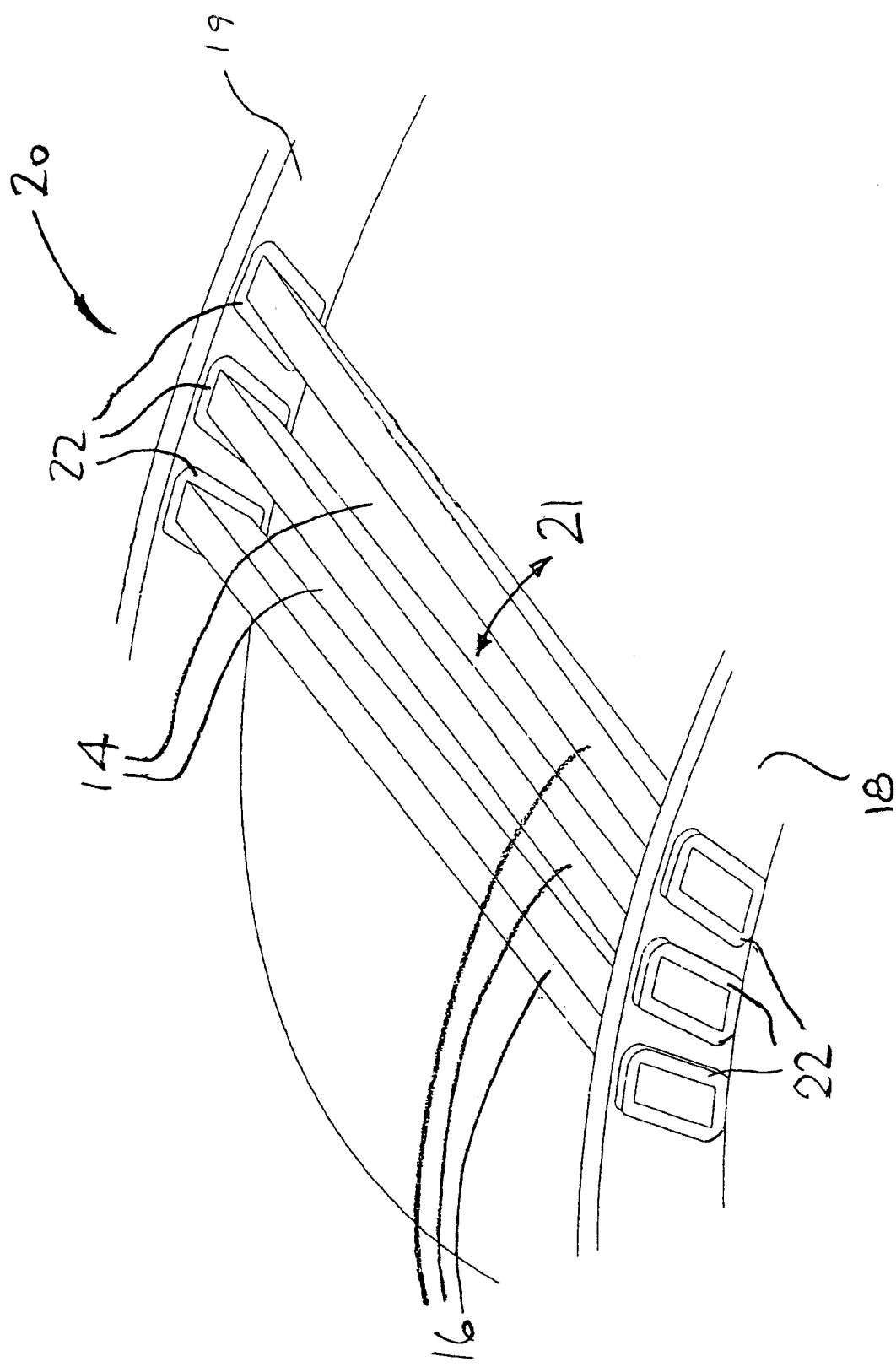
FIG. 2 is a partial view of a tip treatment assembly suitable for use in the engine of FIG. 1.

The tip treatment bars 16 are supported by annular front and rear end supports 18, 19 to provide a tip treatment ring 20 which is fitted within the casing 2 and extends around the fan 4. The tip treatment ring 20 may comprise a series of segments, each of which is made up of a circumferentially extending array of tip treatment bars 16 supported by segmental end supports 18, 19. The end supports 18, 19 and the bars 16 may be formed or fabricated so as to be integral with each other. As an alternative, and as shown in FIG. 2, the end supports 18, 19 and the bars may be made separately, and subsequently assembled together to form the ring 20. The bars 16 may be made from a suitable aluminium alloy, or from other materials, such as composite materials.

In the embodiment shown in FIG. 2, the tip treatment bars are provided with damping boots 22 which provide vibration isolation between the bars 16 and the end supports 18, 19.

In operation of an engine equipped with the tip treatment bars 16, vibration is induced in the bars 16 at a frequency determined by the passage of the blades 4. The vibrating bars 16 deflect in a generally circumferential direction 21 indicated in FIG. 2 and, in an undamped bar, fatigue failure tends to be initiated by cracking at the slot ends. The damping material 24 in the bars 16 shown in FIGS. 3 to 5 serves to reduce the amplitude of induced vibrations in the tip treatment bars 16 as the blades 4 rotate past them. This measure, therefore, reduces the incidence of high cycle fatigue failure in the tip treatment bars 16. The damping material may, for example, be SILASTIC J®.

The tip treatment bar shown in FIG. 3 has a cavity in the form of a channel defined by two side walls 26, 28, and a bottom wall 30. The channel is open at the ends of the bar 32 and 34. The channel is completely filled with damping material 24 such that the exposed faces of damping material are flush with the adjacent bar walls 26, 28, 30.

Figure 4:
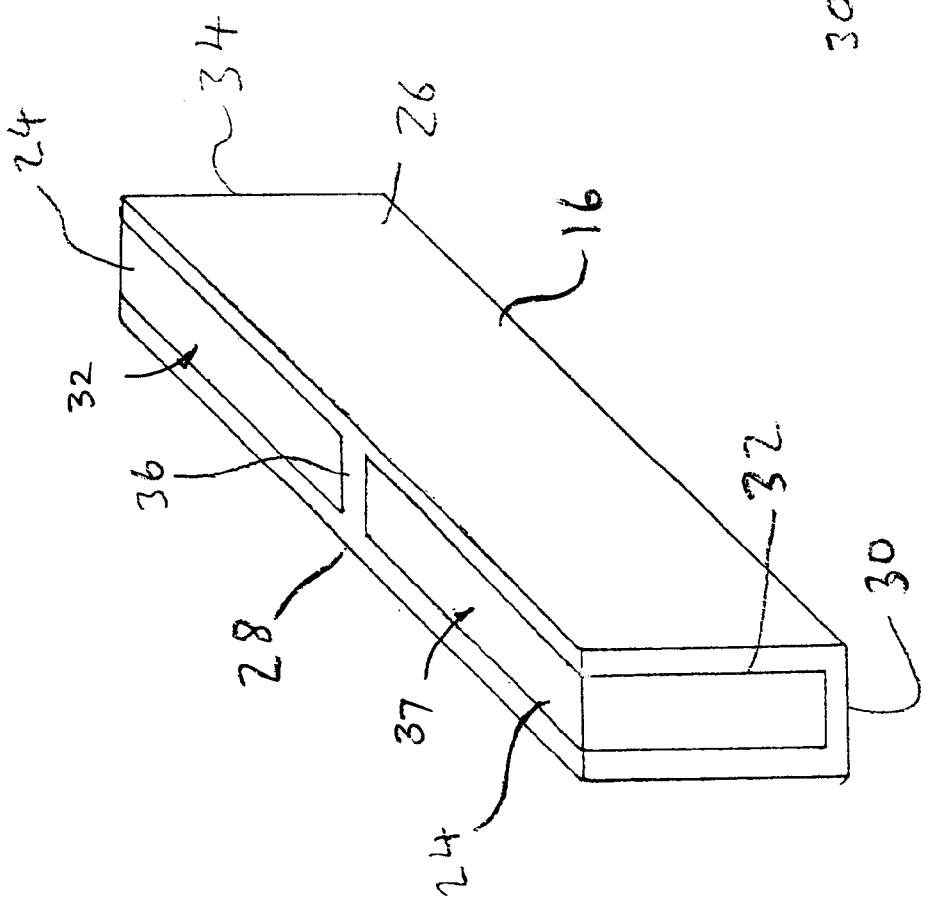
FIG. 4 is a perspective view of a second embodiment of a tip treatment bar.

An alternative structure is shown in FIG. 4. This structure is similar to that of FIG. 3, but includes a partition 36. This partition 36 divides the channel into separate cells 37. Although only one partition 36 is shown, there may be more, to provide more than two cells 37 disposed along the length of the bar 16.

Figure 5:
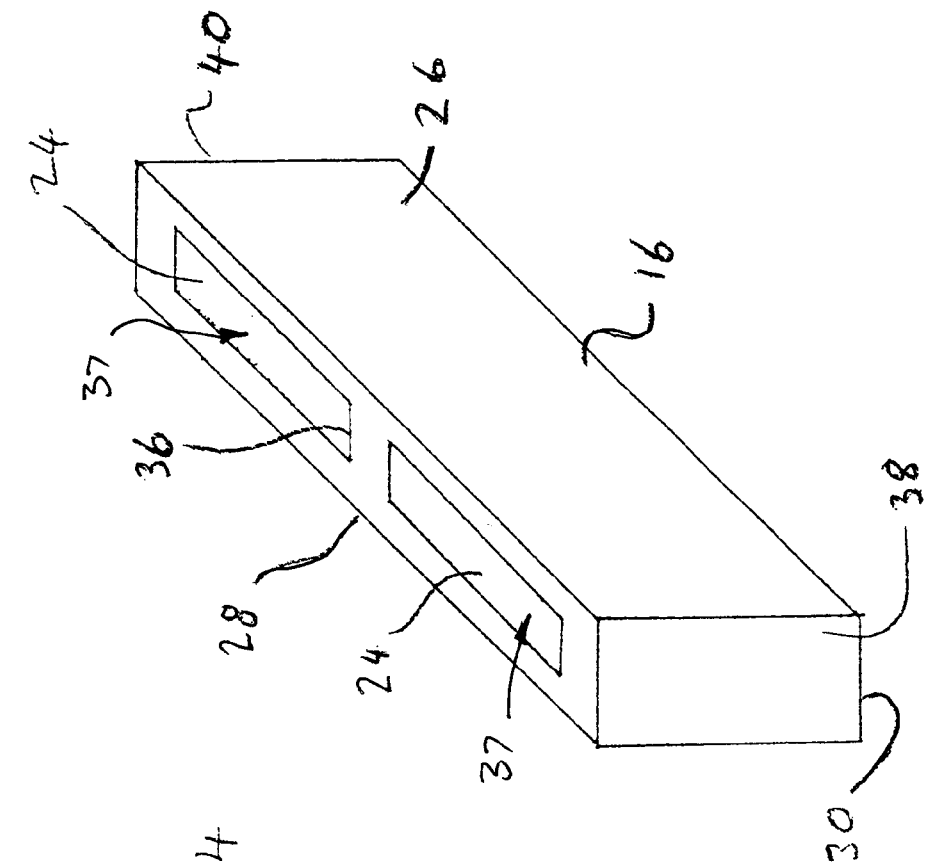
FIG. 5 is a perspective view of a third embodiment of a tip treatment bar.

A third structure is shown in FIG. 5. This is similar to that of FIG. 4, but the cells 37 are closed by end walls 38, 40 at the ends of the bars 16.

When assembled into a tip treatment ring, the bars 16 are oriented so that the cavities containing the damping material 24 open on the radially outwardly facing surface of each bar. This protects the damping material from direct exposure to the temperature of the gas flowing through the engine, and so reduces damage to and degradation of the damping material.

The cavities in the tip treatment bars 16 reduce the structural strength of the bars 16. Thus, while tip treatment bars 16 are able to withstand the forces applied to them in normal operation of the engine, they can deform or break relatively easily if struck by debris, such as a broken blade 4 or a blade fragment. The damping material 24 does not significantly affect this characteristic. Consequently, blade fragments can pass relatively easily through the tip treatment bars 16 for capture by separate external blade containment measures.

As a result, damage to the remaining blades 4 of the rotor shown in FIG. 1, to the immediately downstream guide vane 8, and subsequent parts of the engine can be avoided or minimised.

I claim:

1. A tip treatment bar for use in a gas turbine engine casing, the bar comprising:
   oppositely disposed ends;
   a channel extending between the oppositely disposed ends and the channel having an opening between the oppositely disposed ends; and
   a damping material housed within the channel.

2. The tip treatment bar as claimed in claim 1, wherein the channel forms a cavity extending lengthwise of the bar.

3. The tip treatment bar as claimed in claim 1, wherein the channel is divided by partitions.

4. The tip treatment bar as claimed in claims 1, wherein the channel is open at least one of the oppositely disposed ends of the bar.

5. The tip treatment bar as claimed in claims 1, wherein the channel is closed at both ends of the bar.

6. The tip treatment bar as claimed in claim 1, wherein the bar is of rectangular cross section, and wherein the channel opens on a shorter side of the cross section.

7. The tip treatment bar as claimed in claim 2, wherein the damping material substantially fills the cavity.

8. A tip treatment assembly comprising a plurality of tip treatment bars disposed in a circumferentially extending array, each tip treatment bar comprising:
   oppositely disposed ends;
   an axial side extending lengthwise between the oppositely disposed ends; and
   a cavity which is open at the side of the bar between the oppositely disposed end; and
   a damping material provided in the cavity.

9. The tip treatment assembly as claimed in claim 8, in which the cavities of the bars open in the radially outwards direction with respect to the circumferentially extending array.

10. The tip treatment assembly as claimed in claim 8, further comprising end supports which support the oppositely disposed ends of the bars.

11. The tip treatment assembly as claimed in claim 10, in which the bars are formed separately from the end supports.

12. The tip treatment assembly as claimed in claim 10, in which the bars are formed integrally with the end supports.

13. In a gas turbine engine, a tip treatment assembly comprising:
   oppositely disposed end supports;
   a plurality of tip treatment bars supported at and disposed in a circumferentially extending array, each tip treatment bar comprising:
   oppositely disposed ends of the plurality of tip treatment bars are supported by the respective end supports;
   a side surface facing radially outwardly with respect to the circumferentially extending array;
   a cavity which opens at the side surface; and
   a damping material provided in the cavity.

* * * * *